United States Patent Office 3,223,677
Patented Dec. 14, 1965

3,223,677
PROCESS FOR PREPARING POLYCARBONATES
Markus Matzner, Edison Township, N.J., assignor to Union Carbide Corporation, a corporation of New York
No Drawing. Filed July 2, 1963, Ser. No. 292,477
9 Claims. (Cl. 260—47)

The present invention relates in general to a novel process for preparing polycarbonate resins, and more particularly to an anhydrous process for preparing polycarbonates directly from dihydric phenols and phosgene using Friedel-Crafts reagents.

It has formeraly been proposed to prepare polycarbonates by either ester interchange or direct phosgenation. In the former carbonic acid diester is contacted with a dihydric phenol at temperatures sufficient to promote a condensation reaction. In the latter, inter-facial reaction phosgene and an alkali metal salt of a dihydric phenol are contacted in a two-phase reaction system having an organic medium for one phase and an aqueous medium for the other phase.

Each of the above-mentioned general processes has one or more disadvantages which would be desirably avoided, particularly where large scale commercial operations are involved. For example in the later polymerization stages of the ester-exchange process, the reaction system becomes extremely viscous, thereby giving rise to problems of agitation and to difficult removal from the reaction system of the reaction by-products. Also, the relatively high reaction temperatures to some degree destroy the complete linearity of the polycarbonate products by molecular rearrangement.

By the interfacial direct phosgenation method it has been found that a few but quite interesting dihydric phenols are polymerized to form polycarbonates only with considerable difficulty. Moreover, because of the strongly alkaline nature of the reaction system, chain cleavage of some polymer chains already formed occurs, rendering reproducibility difficult to obtain without particular effort being made to control the pH of the reaction system. This cleavage of polycarbonate chains also occurs when the polymers are heated to ordinary processing temperatures, that is decomposition occurs in polycarbonates containing traces of alkali. Because of the acid sensitive nature of dihydric phenols per se, however, it has heretofore been necessary either to have alkali present in the reaction mass when conducting direct phosgenation or to use and alkali metal salt of the dihydric phenol. Expedients to remove generated HCl such as sparging with an inert gas remove phosgene thus upsetting stoichiometry.

It is, therefore, the general object of the present invention to provide a novel anhydrous process for preparing polycarbonate resins which avoids the disadvantages of the prior known methods, namely the presence of acids or alkali. It is a more particular object of the present invention to provide a process for preparing polycarbonates in excellent yield, good color, and reproducibly high molecular weight.

These and other and more particular objects are accomplished by the process of the present invention which comprises dissolving dihydric phenol, phosgene and a catalytic amount of a Friedel-Crafts catalyst in a solvent to form a reaction mixture at a temperature below the boiling point of the mixture, heating the mixture at just the boiling point, removing the HCl evolved, continuing heating the mixture at higher temperatures as phosgene is consumed but just at the boiling point of the mixture and finally heating the mixture until the boiling point of the solvent is reached.

The dihydric phenols suitably employed include the entire class of such compounds heretofore utilized in the preparation of polycarbonate resins by prior known conventional methods. In general, such dihydric phenols are usually defined as being a mononuclear or polynuclear phenol in which the two hydroxyl groups are directly attached to different nuclear carbon atoms of the same or different aromatic nucleus. The class of suitable dihydric phenols is quite large and includes those compounds described in U.S. Patent 2,950,266—Goldblum and U.S. Patent 2,964,797—Pielstocker et al. which correspond to the general formula (I) 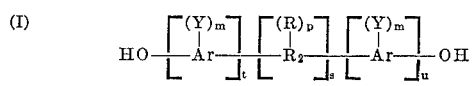

wherein R is hydrogen or a monovalent hydrocarbon radical, for example, alkyl radical (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl ethoxy or polyorganosiloxy, polymethylphenyl siloxy, etc., or an ether, a sulfur-containing linkage such as sulfied, sulfoxide, sulfone, a carbonyl, a tertiary nitrogen or a silicon-containing linkage such as silane or siloxy. $R_2$ can also consist of two or more alkylene or alkyidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ar is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers, preferably 1. When $s$ is zero, however, either $t$ or $u$ may be zero and not both.

In the dihydric phenol compound, the substituent Y may be the same or different, as may be the R. Among the substituents represnted by Y are halogen (e.g. chlorine, bromime, fluorine, etc.) or oxy radicals of the formula OZ, where Z is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues Ar can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis(4-hydroxyphenyl)-propane (Bisphenol-A);
2,2-bis(3,5-dichloro-4-hydroxyphenyl)propane;
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl)-propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihdroxydiphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 5'-chloro-2',4-dihydroxydiphenyl sulfone; 3'-chloro-4,4'-dihydroxydiphenyl sulfone, bis (4-hydroxy phenyl) biphenyl disulfone, etc. The preparation of these and other useful sulfones is described in Patent 2,288,282—Huissman. Ploysulfones as well as substituted sulfones using halogen, nitrogen alkyl radicals, etc. are also useful. Dihydroxy aromatic ethers such as p,p'-dihydroxydiphenyl ether;
the 4,3'-, 4,2'-, 3,3'-, 2,2'-, 2,3'-etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included. Preferably the dihydric phenol is a gem-bis-(hydroxyphenyl) alkane in which the central alkylidene radical contains from 1 to 6 carbon atoms.

The term "Friedel-Crafts catalyst," as used herein refers to the halides of members of the following groups of the Periodic Chart of the Elements (Merck Index, Sixth Edition): IB, for example Cu; IIB, for example Zn; IVB, such as Ti, Zr and Hf; VB, for example Ta and Nb; VIB, such as Cr, Mo, and W; VIII, for example Fe and Co; IIIA, for example B and Al; IVA, for example Sn; VA, such as As, Sb, and Bi; VIA, for example Te.

Also, U and Th halides can be used. Specific examples of suitable halides are $AlCl_3$, $AlBr_3$, $BF_3$, $ZnCl_2$, $FeCl_3$, $SnCl_4$, $TiCl_4$, $TiCl_3$, $BeCl_2$, $ArCl_4$, $HfCl_4$, $ThCl_4$, $NbCl_5$, $TaCl_5$, $UCl_4$, $WCl_6$, $SbCl_5$, $CuCl_2$, $BiCl_3$, $AsF_3$ and $SbCl_5$. Also suitable are certain oxides of some of the foregoing elements, e.g., of aluminum, $Al_2O_3$, of tellurium, $TeO_3$ and also of phosphorous, $P_2O_5$.

Catalyst concentration values are not narrowly critical, but in general from about 50 to about 5000 millimoles of Friedel-Crafts catalyst per mole of dihydric phenol reactant provide adequate catalytic action. Preferably from about 50 to about 500 millimoles of catalyst per mole of dihydric phenol reactant is employed.

In the preferred form of the invention, the reaction mixture comprising an equimolar amount of the bisphenol and phosgene, an inert organic solvent and the catalyst is prepared at a temperature below the boiling point of the mixture at operating pressures. The preferred temperature is about room temperature i.e. 25° C. The mixture is heated just at the boiling point to just maintain ebullience in the mixture. The progress of the reaction may be followed by measuring the evolution of hydrogen chloride in the exit gases or by the gradual rise in temperature as the phosgene is consumed. When the reaction mixture temperature reaches the boiling point temperature of the solvent at operating pressures the reaction is considered to be completed. It is desirable to continue heating at this temperature for a period of time e.g. one hour to insure complete removal of phosgene. The catalyst is then removed by simple filtration and the polycarbonate isolated either by coagulation in a solvent in which the polymer is insoluble or by simple evaporation of the initial solvent. Highest molecular weights are obtained when exactly equimolar amounts of reactants are taken. In cases where the stoichiometry is not exact, lower molecular weight polymers result. The amount of catalyst used and also the time and temperature of heating depend upon the particular reaction system. Optimum reaction conditions vary somewhat from catalyst to catalyst and from one pair of reactants to another.

The order of mixing of the reactants and the catalyst is not a critical factor. Addition of phosgene is accomplished by any of the conventional techniques, i.e. it can be introduced into the reaction system in the form of a gas or in the form of a liquid, but it should be added entirely before heating and reaction begins. Carrier inert gases and solvents can also be used if desired. For complete reaction, the stoichiometric proportions of dihydric phenol and phosgene are one mole phosgene for each mole of dihydric phenol. Advantageously quantities of phosgene much in excess of the stoichiometric amount i.e. over about 4 percent excess over molar are to be avoided. The reaction is not dependent however upon a critical balance of reactants. Large excesses of either reactant can be tolerated provided economic factors and high product yield are not important to the practitioner.

Suitable organic solvents include halogenated aromatics, e.g. chlorobenzene, o-dichlorobenzene, and the like, halogenated aliphatics, e.g. carbon tetrachloride, chloroform, 1,2,4-trichloroethane, sym. tetrachloroethane and the like, toluene, and the like. The solvent should be inert, i.e., nonreactive toward the starting materials and/or the product. Preferred solvents are chlorobenzene, or mixtures thereof particularly with straight chain aliphatic hydrocarbons; or mixtures such as n-heptane/o-dichlorobenzene, n-heptane/o-dichlorobenzenes, etc. The solvent preferably boils at 130° C. under operating pressures.

Optimum temperature for the processing are within the limits of 70–135° C. The time of reaction is difficult to define as it may vary with the catalyst and the polymer.

The present invention is more fully illustrated by the following examples. It is to be understood that these examples are in no way intended to be limitative of the invention,

Example 1

A 294 milliliter solution of phosgene in chlorobenzene containing 31.5676 gms. of phosgene was prepared. The amount of phosgene it contained was determined by titration with excess of methanolic KOH, followed by back titration with nitric acid.

In a flask equipped with a stirrer, reflux condenser (in which was circulated alcohol at —15° C.) topped by a dry ice condenser, thermometer and a gas-dispersion tube (through which a stream, of nitrogen was introduced) were placed successively: 70.3896 gms. of bisphenol–A (thus excess of phosgene used=3.5% mole), 0.7 gm. of $AlCl_3$ (1.6% mole to the bisphenol–A) and 300 milliliters of fresh chlorobenzene. The titrated phosgene solution was then added through the fifth neck of the flask. This addition was carried out through a T-tube, through which continuously circulated nitrogen in order to avoid any losses of phosgene. The reaction mixture was at 25° C.

The mixture was then heated with stirring in a stream of dry nitrogen. After five hours the pot temperature reached 129° C., indicating that the reaction was nearing to its end. Hydrogen chloride evolution, quite strong during the first few hours became at that moment less important. The heating and stirring was continued (in the stream of dry nitrogen) for another 7 hours. As a result, a slightly yellow, quite viscous mixture was obtained.

Coagulation of this mixture in an excess of isopropanol yielded, a white, fibrous polycarbonate with R.V. (at 25° C., as a 0.2 gram sample in 100 in methylene chloride) of 0.34. Yield of the polymer: 99.5%.

Example 2

Example 1 was duplicated with the following 290 ml. of a solution of phosgene in o-dichlorobenzene, containing 27.6185 of $COCl_2$
62.7975 gms. of bisphenol–A (thus excess of phosgene-1.5% mole)
147 milliliters of n-heptane
53 milliliters of fresh o-dichlorobenzene
0.68 gm. of $AlCl_3$ (1.81% mole to the bisphenol–A)
Time of reaction: 12 hrs. Yield of obtained polymer: 98%
Reduced viscosity was 0.32

What is claimed is:

1. Process for preparing polycarbone resins which comprises dissolving a dihydric phenol, phosgene and a catalytic amount of a Friedel-Crafts catalyst in an inert liquid organic solvent to form a reaction mixture at a temperature below the boiling point of the mixture, heating the mixture at just the boiling point, removing the HCl evolved, continuing heating the mixture at higher temperatures as phosgene is consumed but just at the boiling point of the mixture and finally heating the mixture until the boiling point of the solvent at operating pressures is reached.

2. Process claimed in claim 1 wherein the Friedel-Crafts catalyst is aluminum chloride.

3. Process claimed in claim 2 wherein the catalyst concentration is 50 to 5000 millimoles per mole of dihydric phenol reactant.

4. Process claimed in claim 2 wherein the catalyst concentration is 50 to 500 millimoles per mole of dihydric phenol reactant.

5. Process claimed in claim 1 wherein the dissolution is effected at room temperatures.

6. Process claimed in claim 1 wherein the solvent is a halogenated aromatic solvent.

7. Process claimed in claim 1 wherein the dihydric phenol is a gem-bis (4-hydroxyphenyl) alkane in which the central alkylidene radical contains from 1 to 6 carbon atoms.

8. Process claimed in claim 1 wherein the dihydric phenol is 2,2-bis(4-hydroxyphenyl)propane.

9. Process claimed in claim 1 wherein the dihydric phenol and phosgene are present in substantially equimolar amounts.

No references cited.

MURRAY TILLMAN, *Primary Examiner.*